C. F. SCHAFFNER.
SILO CHUTE.
APPLICATION FILED MAR. 27, 1919.

1,329,801. Patented Feb. 3, 1920.

INVENTOR
Charles F. Schaffner
by
Owen, Owen & Crampton

UNITED STATES PATENT OFFICE.

CHARLES F. SCHAFFNER, OF FAYETTE, OHIO.

SILO-CHUTE.

1,329,801. Specification of Letters Patent. Patented Feb. 3, 1920.

Application filed March 27, 1919. Serial No. 285,408.

*To all whom it may concern:*

Be it known that I, CHARLES F. SCHAFFNER, a citizen of the United States, and a resident of Fayette, in the county of Fulton and State of Ohio, have invented a certain new and useful Silo-Chute; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention has for its object to provide a silo chute that may be easily constructed and connected with the silo.

In all silos a chute is provided which is located along the doors used for filling and emptying the silo. A chute provides a means for directing the silage in its descent to the ground.

To illustrate a practical application of my invention I have selected a silo chute containing the invention and shall describe it hereinafter. The silo chute selected is illustrated in the accompanying drawings.

Figure 1:
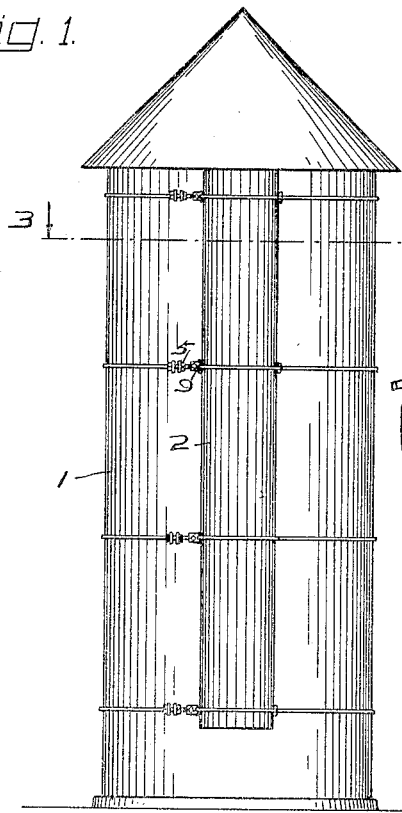
Figure 2:
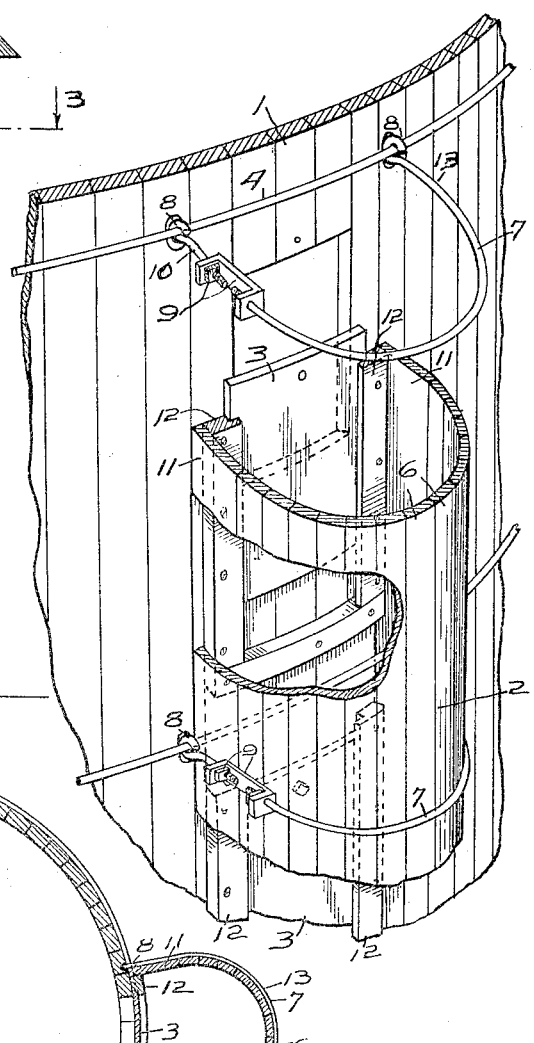
Figure 3:
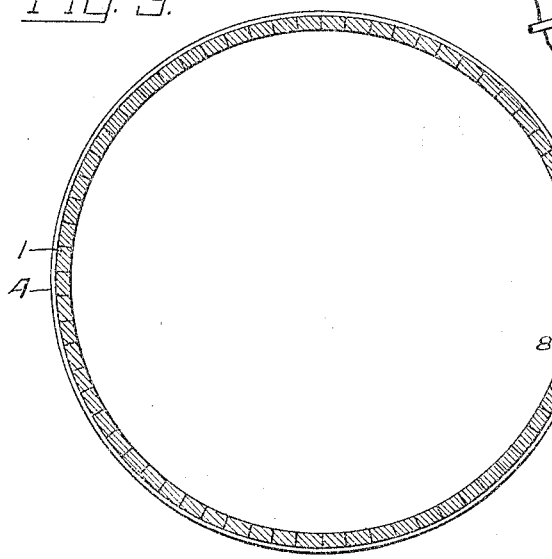

Figure 1 of the drawings illustrates a side view of the chute and of the silo. Fig. 2 is a sectional perspective view showing the construction of the silo chute. Fig. 3 is a sectional view taken on the line 3—3 indicated in Fig. 1.

1, in the figures, is the silo. 2 is the chute which extends along the doors 3 of the silo. The silo is constructed of boards which are bound together by means of hoops 4, the ends of which are bound together by suitable turnbuckles 5. The silo chute is formed of the boards 6 and 11 that are placed edge to edge and are bound by the rods 7 whose ends are caught under the hoops 4. The ends 8 of the rods 7 are hooked onto the rods or hoops 4. The rods 7 are formed of two parts 10 and 13 and the two parts are joined together by suitable U-parts and nuts 9. One of the parts 10 of each of the rods 7 is made very much shorter than the other part and terminates near the outer edge of boards 11 that are much wider than the other boards 6 of the chute. When the parts of the rods 7 are drawn together by the operation of the nuts 9 the boards 6 and 11 are clamped tightly together at their edges and are thus held rigidly in position.

The boards 11 are placed along the side of the frame 12 and the rods 7 are secured close to the sides of the frame 12, and thus the boards 11 and the chute are held clamped between the rods 7 and the sides of the frame 12, which securely holds the chute in position.

I claim:

In combination with a silo having binding hoops, a chute formed of a plurality of boards placed edge to edge and bound together by rods, the rods hooked onto the hoops of the silo, means for drawing the parts of the rods together to clamp the boards against the edges of the adjoining boards.

In testimony whereof I have hereunto signed my name to this specification.

CHARLES F. SCHAFFNER.